Figure 1:
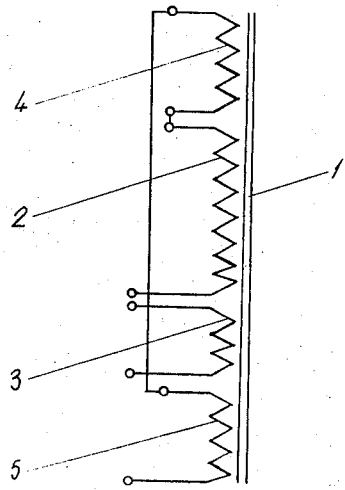

United States Patent
Grosu

[11] 3,833,849
[45] Sept. 3, 1974

[54] TRANSFORMERS WITH ADDITIONAL COMPENSATING REACTOR WINDINGS FOR ELECTRIC ARC WELDING

[75] Inventor: Stefan I. Grosu, Bucharest, Romania

[73] Assignee: Institutul De Cercetare Si Proiectare Pentru Industria Electrotehhica, Bucharest, Romania

[22] Filed: July 26, 1973

[21] Appl. No.: 382,830

Related U.S. Application Data

[63] Continuation of Ser. No. 245,829, April 20, 1972, abandoned.

[52] U.S. Cl............ 323/44 R, 219/131 R, 219/135, 323/48, 323/83, 336/5, 336/146, 336/170
[51] Int. Cl............................................. B23k 9/10
[58] Field of Search....... 336/5, 146, 147, 170, 183; 323/44, 43.5 R, 48, 49, 53, 54, 83, 91; 219/131 R, 131 WR, 135, 136

[56] References Cited
UNITED STATES PATENTS

| | | | |
|---|---|---|---|
| 1,088,704 | 3/1914 | Johannesen | 336/147 |
| 2,506,964 | 5/1950 | Martin | 323/48 |
| 3,351,878 | 11/1967 | Hajicek | 336/170 |
| 3,384,810 | 5/1968 | Kelsey | 323/48 |
| 3,418,563 | 12/1968 | Grosu | 336/147 X |
| 3,665,150 | 5/1972 | Mejia | 336/170 X |

*Primary Examiner*—Gerald Goldberg

[57] ABSTRACT

Transformer for electric arc welding which allows the stepwise control of the welding current by means of an inductance coil connected in the primary or secondary circuit, formed by coils placed for each phase, on the magnetic core of the respective phase, on which there are also mounted the primary and secondary windings. These coils are connected in groups by two pieces. Of the two coils of a group, one is magnetically strongly-coupled with the primary winding and the other, with the secondary winding, which leads to the increase of the reactor efficiency. The transformers can be monophase or polyphase, especially three-phase. The three-phase transformers may be employed for the supply of alternating-current welding, three-phase arc welding, or of direct curent arc welding through rectifiers.

2 Claims, 2 Drawing Figures

PATENTED SEP 3 1974　　　　　　　　　　　　　3,833,849

TRANSFORMERS WITH ADDITIONAL COMPENSATING REACTOR WINDINGS FOR ELECTRIC ARC WELDING

This is a continuation of application Ser. No. 245,829 filed Apr. 20, 1972 now abandoned.

The provision of invention has as object transformers for the alternating-current arc welding, or for the supply of some rectifier elements used in direct-current welding.

In the existing technique the welding transformers are characterized by the control of the welding current.

Thus there are known different systems:

1. with control by means of the variation of the distance between the coils, or the displacement of a magnetic shunt. These are mechanically complicated;
2. with a magnetic shunt which is magnetized by controllable direct-current. These are relatively complicated and lead to the increased losses; and
3. with a reactor formed by two coils connected in opposition and placed on the lateral columns of the monophase magnetic core, shell type, of the transformer.

All of these, in operation, lead to an increase of the induction into one of the lateral columns, to the increase of the magnetization current and of the losses. The solution may not be used with the monophase transformers.

4. with two primary windings and a secondary one, or with two secondary windings and a primary one, with the current control in steps, by means of the switching of some sections of the windings. These are necessary relatively complicated switchings, because for each change of step it is necessary to change two connections and they are no more favorable than in monphase, or to the cores with two columns.

Accordingly to the invention, one uses a transformer in which the primary and secondary windings of a transformer phase are placed, on the same magnetic column, with two other coils, one of which is magnetically strongly-coupled with the primary winding and the other is magnetically strongly-coupled with the secondary winding. The two coils are connected in opposition and set up on the whole, a reactor, which is connected in series with the primary winding or with the secondary one.

The above mentioned magnetic coupling has a particular importance for securing an efficient reactor. As a result of the leakage flux combination of the transformer and reactor windings, the reactor inductance is substantially bigger than that which would be obtained if the two coils were alone mounted on the magnetic core, or were magnetically coupled in equal measure with the primary and secondary windings.

Also, the connection sense or direction of the reactor with the primary or secondary windings is important. If the connection is made so that, in the reactor winding strongly-coupled with the primary winding, the leakage lines of force should have the same sense as the leakage lines of force of the primary winding and into strongly-coupled coil with the secondary winding, the leakage lines of force should have the same sense as the leakage lines of force of the secondary winding, the reactor has a reactance, which leads to the decrease of the welding current. If the connection is made in the inverse sense, so that the mentioned lines of force should have an inverse senses, the reactor has a "negative" reactance so its introduction in series with the primary or secondary winding can lead to the increase of the short-circuit current and welding one.

Figure 2:
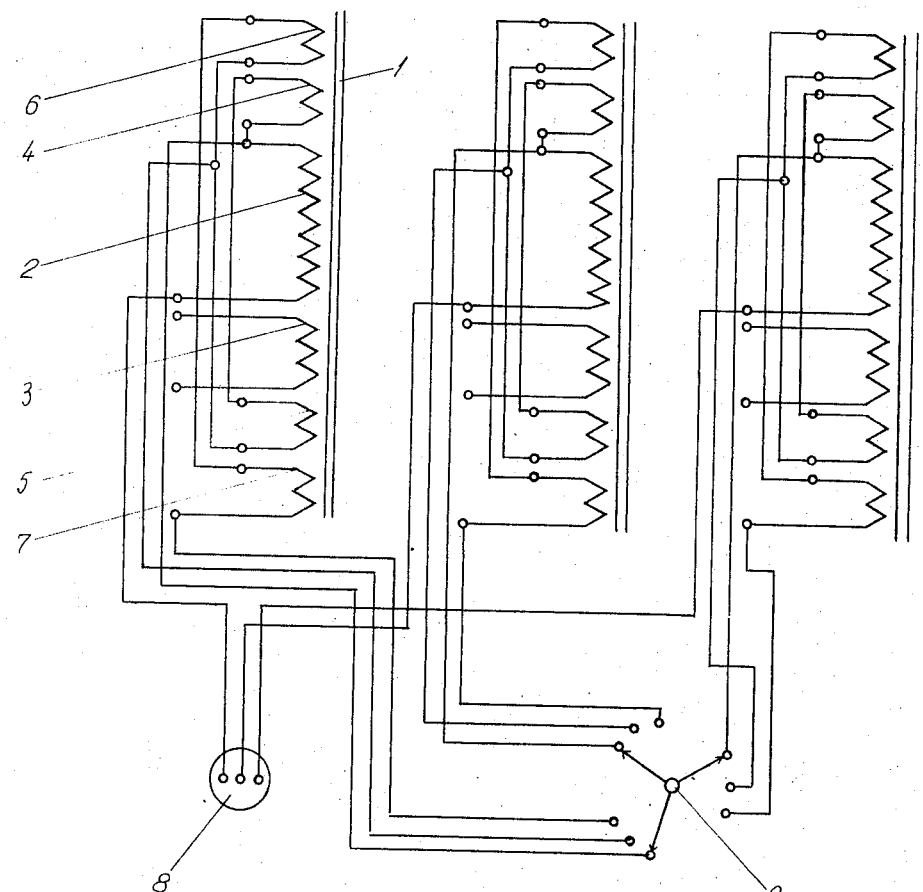

In the accompanying drawings:

FIG. 1 is a schematic view of a first arrangement of transformer in accordance with the invention; and FIG. 2 is a schematic view of a second arrangement of transformer in accordance with the invention.

In the arrangement of FIG. 1, the primary 2 and the secondary 3 winding of a phase are mounted on a core 1, in alignment one against the other (head to head). At an end of the column and neighboring the primary winding, a coil 4 of the reactor is mounted, and at the other end, and neighboring the secondary winding, there is mounted the other coil 5 of the reactor.

The transformer, including the reactor, can be monophase as shown, or polyphase. The reactor can be single or divided. Thus for instance, it can be constituted by groups of two coils connected in opposition and the groups connected in series between them and with the primary or secondary winding. Thus in the FIG. 2 on a magnetic core 1, there is placed a primary winding 2, a secondary 3, and the reactor is constituted by the coil groups 4 with 5 and 6 with 7. FIG. 2 corresponds to a three-phase transformer, with a star connected primary winding, supplied from a tap 8. The coils 3 of the secondary maybe connected either in delta connection or in star connection and can supply an electrical three-phase arc, or a rectifier cell group for direct current welding. The charging of the current steps, is made by means of the switch 9, placed on the neutral point. In the case when the sense of the connections is so that they obtain a reactor which decreases the welding current, one obtains the maximum current when the switch 9 is in the position of FIG. 2. By passing to the neighboring position of switch 9, one obtains a smaller current, and by passing to the last position, the smallest current. The number of the control steps can be chosen according to the need. One can use also circuits with two switches, one for coarse and the other fine control.

For extending the control field, one can use both manners of connection consequently the reactance is "negative" also.

The non-load secondary voltage on different control steps is practically constant. What varies from a step to another one is the current. Usually the two coils which set up a group in opposition, have a equal number of winding turns. In case that one considers necessary as, from a step to another one to vary the non-load secondary voltage, these coils can have a different number of winding turns.

An advantage of the invention is that one obtains the control by means of a reactor constituted from coils placed on the magnetic core of the transformer; this leads to decreases in the construction, weight and cost price. The invention is particularly advantageous when used in three-phase transformers.

I claim:

1. Transformer for electric arc welding, comprising a magnetic core, the primary and the secondary winding disposed in alignment with said magnetic core, two other coils also disposed in alignment and in alignment with the two windings on the same magnetic core, one of said coils being disposed on end of the core adjacent to the primary windings and the other coil being disposed at the other end of the core adjacent to the secondary winding, and circuit means connecting the two coils in opposition so that they constitute a reactor, and further circuit means connecting said reactor in series with one of the primary and secondary windings.

2. Transformer, according to claim 1, comprising switching means in circuit with a reactor for selectively connecting it so that it has positive reactance and causes the current output of the transformer to decrease, and so that it has a negative reactance and causes the current output of the transformer to increase.

* * * * *